United States Patent
Wen

[19]

[11] Patent Number: 5,927,304
[45] Date of Patent: Jul. 27, 1999

[54] FOOD ARTICLE WASHER

[76] Inventor: Sheree H. Wen, 796 Longhill Rd., Briarcliff Manor, N.Y. 10510

[21] Appl. No.: 08/691,942

[22] Filed: Aug. 5, 1996

[51] Int. Cl.⁶ ........................................................ B08B 3/10
[52] U.S. Cl. ........................ 134/153; 134/157; 134/148; 134/184; 134/186; 134/115 R; 422/24
[58] Field of Search .................................. 134/184, 186, 134/155, 153, 157, 148, 201, 1, 115 R; 99/451; 422/24; 426/238, 248; 15/3.15

[56] References Cited

U.S. PATENT DOCUMENTS

| | | | |
|---|---|---|---|
| 3,478,758 | 11/1969 | Davies | 422/24 |
| 3,672,823 | 6/1972 | Boucher | 422/24 |
| 3,817,703 | 6/1974 | Atwood | 426/238 |
| 3,915,180 | 10/1975 | Jacobs | 134/108 |
| 4,173,051 | 11/1979 | Reid . | |
| 4,448,750 | 5/1984 | Fuesting | 422/20 |
| 4,591,485 | 5/1986 | Olsen et al. | 422/24 |
| 4,698,206 | 10/1987 | Nevin | 422/24 |
| 4,710,233 | 12/1987 | Hohmann et al. | 134/1 |
| 4,728,368 | 3/1988 | Pedziwiatr | 422/24 |
| 4,836,684 | 6/1989 | Javorik et al. | 134/184 |
| 5,088,510 | 2/1992 | Bannon | 134/184 |
| 5,113,881 | 5/1992 | Lin et al. | 134/150 |
| 5,120,499 | 6/1992 | Baron | 422/24 |
| 5,144,144 | 9/1992 | Borovsky | 422/24 |
| 5,364,645 | 11/1994 | Lagunas-Solar | 426/248 |
| 5,377,709 | 1/1995 | Shibano . | |
| 5,409,594 | 4/1995 | Al-Jiboory et al. . | |
| 5,413,131 | 5/1995 | Medlock | 134/180 |
| 5,421,353 | 6/1995 | Jakubowski . | |
| 5,432,969 | 7/1995 | Oh . | |
| 5,501,241 | 3/1996 | Jacobson | 134/200 |
| 5,551,461 | 9/1996 | St. Martin | 134/200 |

FOREIGN PATENT DOCUMENTS

| | | | |
|---|---|---|---|
| 2599255 | 12/1987 | France | 422/20 |
| 3739979 | 6/1989 | Germany | 422/20 |
| 60-16559 | 1/1985 | Japan | 426/248 |
| 62-282686 | 12/1987 | Japan | 422/20 |
| 1-284385 | 11/1989 | Japan | 210/900 |
| 2-43984 | 2/1990 | Japan | 422/20 |
| 2-46253 | 2/1990 | Japan | 426/248 |
| 947699 | 1/1964 | United Kingdom | 422/20 |
| 2040150 | 8/1980 | United Kingdom | 422/20 |
| 2162424 | 2/1986 | United Kingdom | 422/20 |

OTHER PUBLICATIONS

LS Technical Bulletin DRS 080592 GER, pp. 1–2.

*Primary Examiner*—Frankie L. Stinson
*Attorney, Agent, or Firm*—Cooper & Dunham LLP

[57] ABSTRACT

A food article washer includes a container for containing food articles and a cleaning liquid used for cleaning the food articles. A basket is provided within the container for holding the food articles contained within the container. A vibration device imparts vibrations to the cleaning liquid contained within the container, without coming into physical contact with the food articles. The vibrations break driving the liquid into the food articles.

35 Claims, 4 Drawing Sheets

FOOD ARTICLE WASHER

FIELD OF THE INVENTION

The present invention relates to a food article washer in general and, more particularly, to a washer for cleaning various types of food articles including fruits, vegetables, meats, grains, etc.

BACKGROUND OF THE INVENTION

Fruits and vegetables are generally grown in an environment which exposes them to foreign materials such as dirt, sand, insects, insecticides, etc. Other food articles are often processed and/or stored in environments which expose them to similar foreign materials. In addition, food articles are constantly being exposed to micro-organisms such as bacteria, viruses, yeasts, molds, etc. Accordingly, it is necessary to sufficiently clean food articles prior to consumption. However, merely rinsing food articles such as fruits and vegetables, for example, may not sufficiently remove the foreign substances. This is particularly so when trying to sufficiently clean leafy vegetables such as lettuce or cabbage, for example, since foreign substances may tend to accumulate in between the leaves and in the many crevices commonly found on such vegetables. In addition, foreign substances and/or micro-organisms may even penetrate the pores and crevices in the skin or leaves of the fruit or vegetable and are not easily removed simply by rinsing. Accordingly, it may be necessary to scrub the fruit or vegetable to remove any accumulated foreign substances. However, scrubbing the fruit or vegetable is time consuming, inefficient and may bruise the fruit or vegetable. Foreign substances and/or micro-organisms which are commonly found on the surface of other food articles such as grains, meats (e.g., beef, poultry, pork, etc.), are even more difficult to clean, since these food articles cannot be easily washed and scrubbed.

A vegetable washer is described in U.S. Pat. No. 4,173, 051. The washer has a container including a water driven turbine that spins an impeller within the container. The impeller includes a plurality of flexible blades or bristles that come into contact with the food articles placed in the container. The blades or bristles cause an agitation to remove foreign materials from the food articles. A system is provided for directing a plurality of water streams at the food articles.

Although such a device may be suitable for washing non-fragile fruits and vegetables, the system is not suitable for all types of fruits and vegetables, and particularly fragile fruits and vegetables. For example, the bristles and blades of the impeller are described in the '051 patent as being formed of a material that will not damage or bruise food articles being cleaned. However, anytime the bristle or blade is brought into contact with a food article having a very fragile surface (e.g., a tomato), the food article may be damaged by repeated contact with the bristles or blades. In addition, the washing system described in the '051 patent is rather complex, requiring a hose for attaching the water turbine to a pressurized water source such as a kitchen sink, as well as requiring a place for the water to be discharged. Accordingly, such a device has limited utility.

A salad spinner is a known device that is commonly used to wash and dry vegetables. In this type of device, the food articles (typically salad greens or cut vegetables), are placed into a basket provided within a container. The basket generally has a plurality of holes for allowing water to flow through. Water is allowed to run over the vegetables. The flow of water is then stopped and the basket is spun for a period of time to spin the water out of the vegetables. The spinning action acts to remove the water from the vegetables by centrifugal force. However, such a device is not effective for cleaning fragile food articles, since the spinning action may tend to bruise or otherwise damage such fragile food articles. In addition, such a device is not effective for cleaning foreign materials or micro-organisms that tend to accumulate in pores or crevices in the skin or leaves of the food article.

SUMMARY OF THE INVENTION

According to an embodiment of the present invention, a food article washer includes a container for containing food articles and a cleaning liquid. A basket is provided within the container for holding the food articles contained within the container, and a vibration device imparts vibrations to the cleaning liquid contained within the container. The vibration device does not come into physical contact with the food articles. The vibrations drive the cleaning liquid into the food articles to more efficiently clean them without damaging the food articles. The basket may be removable from the container. According to a preferred embodiment of the present invention, the vibration device consists of an ultrasonic and/or sonic transducer for generating acoustic energy in the cleaning liquid and the basket is designed to allow the acoustic energy to penetrate through to the food articles contained therein. A spinner may be provided for spinning the basket within the container and can include a powered device or a hand driven device.

An ultraviolet light source can be provided within the container for generating ultraviolet light effective for killing micro-organisms on the food articles.

BRIEF DESCRIPTION OF THE DRAWINGS

Other objects, features and advantages of the present invention will become more fully apparent from the following detailed description of the preferred embodiments, the appended claims and the accompanying drawings in which:

DESCRIPTION OF THE PREFERRED EMBODIMENTS

Figure 1:
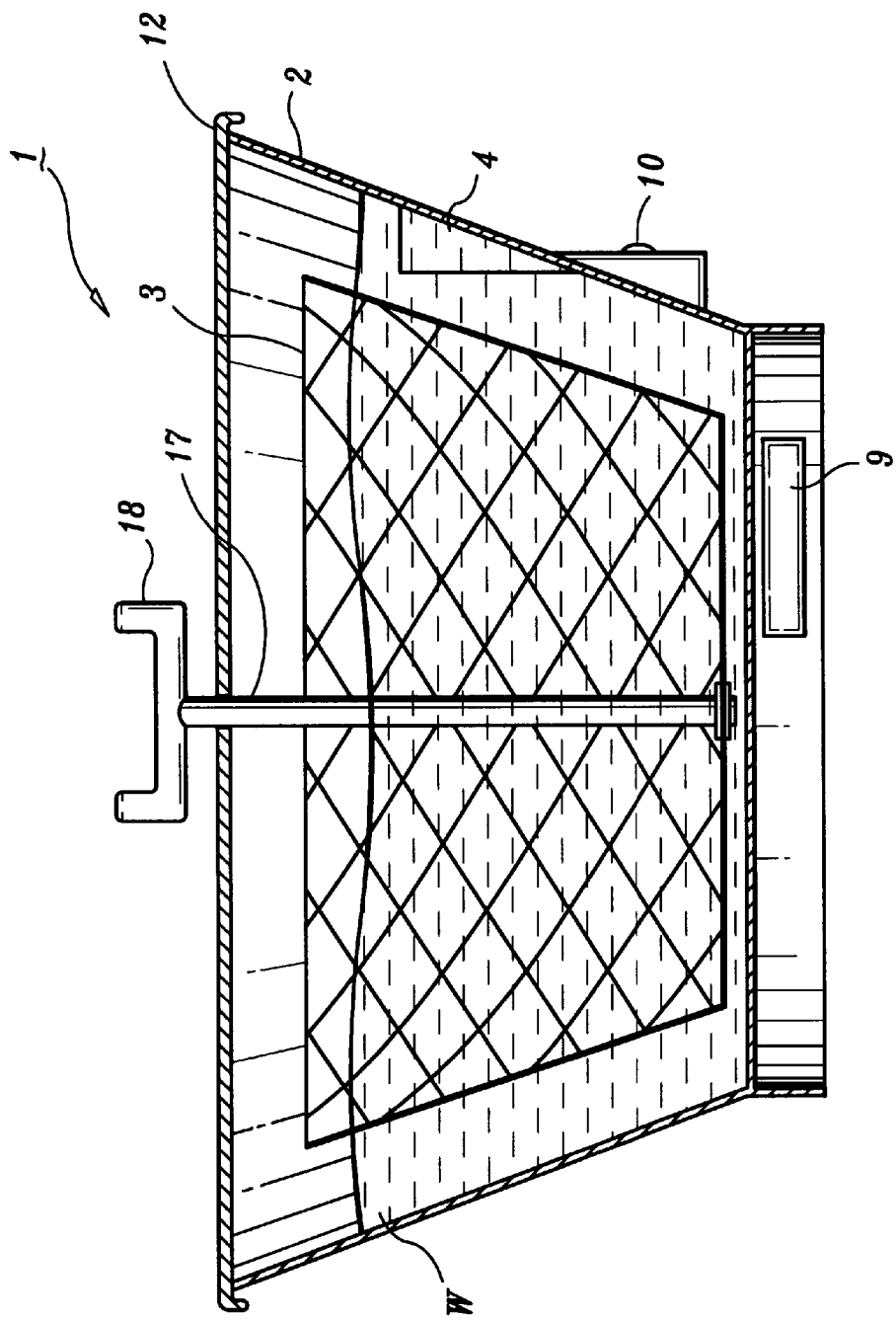
FIG. 1 is a front view partially broken away of a food article washer according to an embodiment of the present invention.

Referring now to the drawings in which like reference numerals refer to like or similar parts, description of a first embodiment of the present invention will be made by reference to FIG. 1.

The food article washer according to a first embodiment of the present invention is depicted in FIG. 1 and is referred to generally as washer 1. Washer 1 includes a container 2 dimensioned for receiving and containing food articles to be cleaned and a cleaning liquid used for cleaning the food articles (not shown). A basket 3 may preferably be provided within container 2 for holding the food articles at a central position within the container. A vibration device 4 such as a transducer, for example, is provided for imparting vibrations to the cleaning liquid, such as water (W), contained within container 2. The vibration device 4 generates waves in the cleaning liquid that break up surface tension of the cleaning liquid and drive the liquid into the pores and crevices of the food articles. The vibration device thus acts to clean the food articles without the need of any physical structure coming into contact with the food articles. Accordingly, the food articles can be cleaned without damage thereto.

Vibration device 4 can consist of any known type of device capable of generating vibrations in the liquid contained within container 2. For example, an ultrasonic transducer and/or a sonic transducer may be used to generate acoustic vibrations (e.g., ultrasonic or sonic acoustic waves) in the cleaning liquid.

Although only one vibration device 4 is depicted in FIG. 1, one or more additional vibration devices may be provided at various positions along the wall of container 2. Various other vibration device arrangements are also possible. For example, one or more vibration devices 4 may be provided along the bottom of container 2 or vibration devices may be provided on both the wall and the bottom of container 2.

FIG. 1 depicts vibration device 4 within container 2 for imparting vibrations directly into the cleaning liquid within container 2. However, one or more vibration devices 4 can be provided on the outside of container 2, in place of or in addition to the vibration device or devices mounted inside the container 2. In this case, the transmitting surface of the vibration device should be mounted in direct contact with the outside surface of container 2 so that the acoustic energy generated by the vibration device can be efficiently transmitted through the container and into the cleaning liquid.

A controller 9 and switch or dial 10 are provided for controlling the energy level of the acoustic signal emitted by vibration device 4. Controller 9 and switch or dial 10 will be described in further detail below by reference to the next embodiment of the present invention.

Preferably, a system is provided for spinning basket 3 within container 2. For example, according to the embodiment of the present invention depicted in FIG. 1, a handle is provided for manually spinning basket 3. More specifically, a distal end of shaft 17 is attached to the bottom of basket 3. Shaft 17 extends through an opening formed in lid 12 and a handle 18 is attached to the proximal end of shaft 17. This arrangement allows a user to spin basket 3 by turning handle 18. Basket 3 can be spun as desired while the vibration device 4 is or is not operating.

Another embodiment of the present invention will now be described by reference to FIGS. 2 and 5. This embodiment is similar to that shown in FIG. 1, but includes a motor system for rotating basket 3.

Rotating platform 5 is provided at the bottom of container 2. According to this embodiment, basket 3 rests on platform 5 so that basket 3 rotates along with platform 5. This arrangement allows food articles placed in basket 3 to be automatically rotated and exposed to the vibrations generated by vibration device 4 from various angles, thereby enhancing the cleaning action. In addition, the rotating motion within the cleaning liquid aides in removing foreign materials loosened by the vibrations. Preferably, the basket 3 is removably attached to platform 5 so that a user can remove the basket to place the food articles therein and/or to further rinse and remove the food articles after being cleaned.

Platform 5 is attached to shaft 6 of motor 7 in a known manner. Motor 7 is housed within base 8 of container 2 in a sealed manner such that the cleaning liquid within the container does not leak from the container. Motor 7 is a variable speed motor and is connected to controller 9 through motor control line 13 (FIG. 5). Controller 9 includes read-only memory (ROM) that is preprogrammed to control the speed of motor 7 either linearly or in incremental speeds such as slow, medium, and fast. A switch or dial 10 is connected to controller 9 by speed switch line 16 so that a user can set the desired speed of rotation of motor 7 and thus can control the speed of rotation of platform 5.

Controller 9 can also be used to control the energy delivered by vibration device 4. That is, vibration device 4 is connected to controller 9 through control line 14 (FIG. 5). The energy being generated by vibration device 4 can be changed either linearly or incrementally in a step like manner. A second switch or dial 11 is electrically attached to controller 9 through switch line 15 so that a user can control the desired energy level of the signal being generated by vibration device 4.

Controller 9 can be any suitable type of controller circuit and, for example, can consist of a microprocessor controller. Various types of controllers suitable for use in a device such as the present invention are known in the art. Accordingly, controller 9 will not be described in detail. Briefly, however, controller 9 includes ROM for storing one or more operating programs. Controller 9 can also include RAM that can be programmed by the user through use of an alphanumeric control pad (not shown). Of course, controller 9 can also include various other types of memories and/or peripherals or peripheral interfaces as desired.

Controller 9 can also be preprogrammed or can be programmed by the user to automatically run in cycles. For example, it may be desirable for the food articles to initially soak in the cleaning liquid for a few minutes prior to switching on the vibration device 4. In addition, it may be desirable to activate vibration device 4 with or without platform 5 rotating and to operate vibration device 4 at various energy levels at different times during the wash cycle. Accordingly, controller 9 can be programmed to operate vibration device 4, rotating platform 5 and optional UV light source 40 (FIG. 4) for specified periods of time. In addition, the vibration device 4 can be operated at specified energy levels and the rotating platform can be set to rotate at a predetermined speed or speeds as desired.

Figure 2:
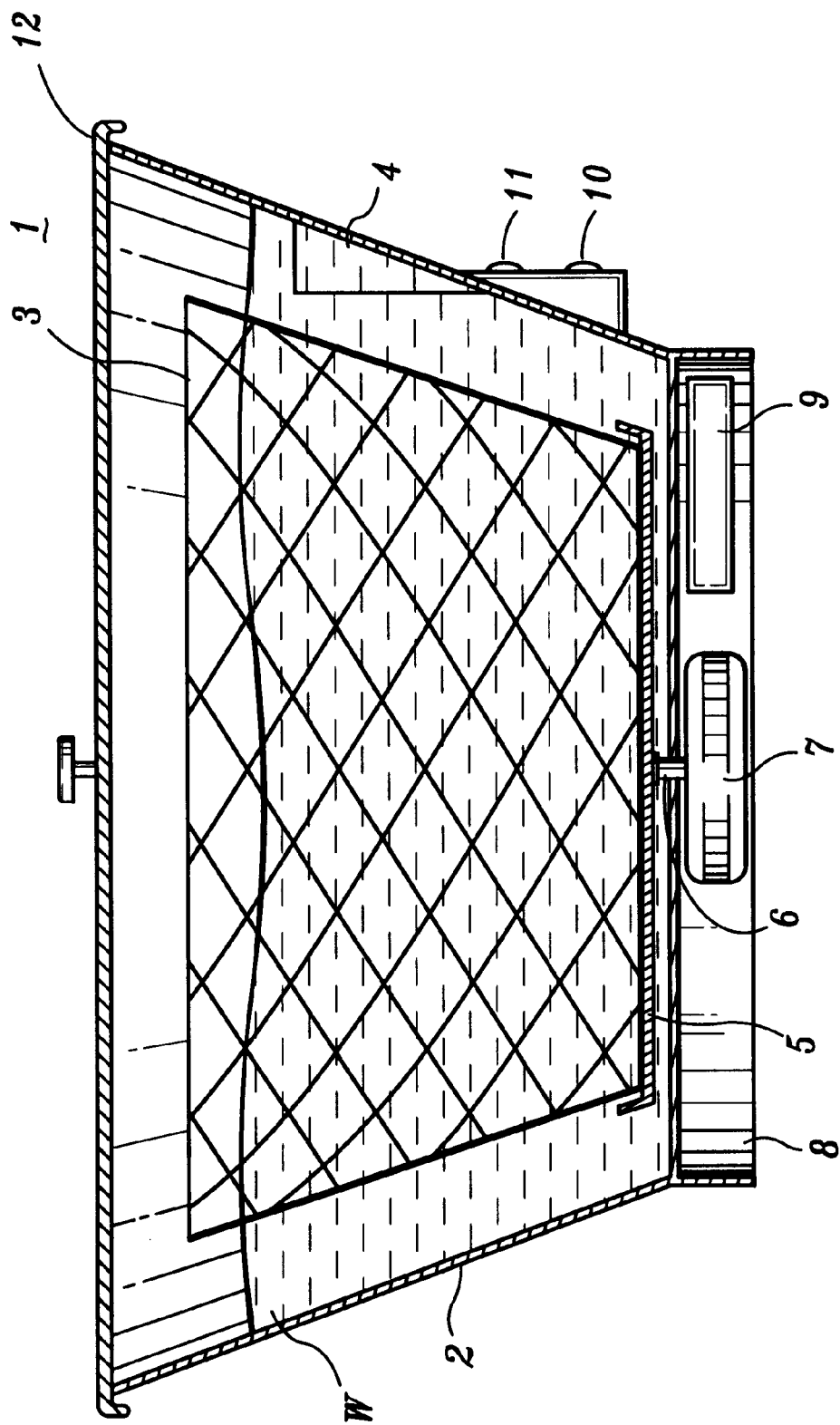
FIG. 2 is a front view partially broken away of a food article washer according to another embodiment of the present invention.
Figure 3:
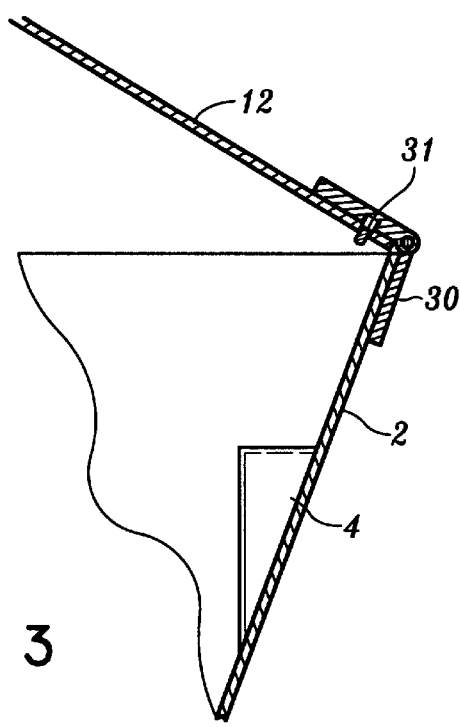
FIG. 3 is a partial side view of a food article washer including a hinged lid according to an embodiment of the present invention.

A removable lid 12 is shown in FIGS. 1 and 2 for covering container 2 to prevent the cleaning liquid and/or food articles from being discharged from container 2 when vibration device 4 is operating and/or when platform 5 is rotating. According to an embodiment of the present invention as depicted in FIG. 3, lid 12 can be mounted to container 2 utilizing hinge assembly 30. Hinge assembly 30 allows the lid to be raised, lowered and maintained in the open or closed position as desired.

Hinge assembly 30 can also be provided with a micro switch 31 which is electrically connected to controller 9 through line 32. Micro switch 31 provides an indication to controller 9 so that operation of vibration device 4, the rotating platform 5, and optional UV light source 40 (FIG. 4) can be stopped by controller 9 while the lid is in the open position. This assures that the cleaning liquid and/or the food articles being cleaned will not be ejected from the container when the lid is opened and ensures that a user will not be exposed to potentially harmful UV radiation. Of course, the micro switch 31 can be provided at a position other than at the hinge assembly 30, and can be used whether or not the embodiment has a hinge assembly 30. For example, the micro switch 31 can be provided anywhere along the top edge of container 2 for sensing when the lid is in the open position and for preventing operation of the vibration device 4, the rotating platform 5 and the optional UV light source 40 accordingly.

Figure 4:
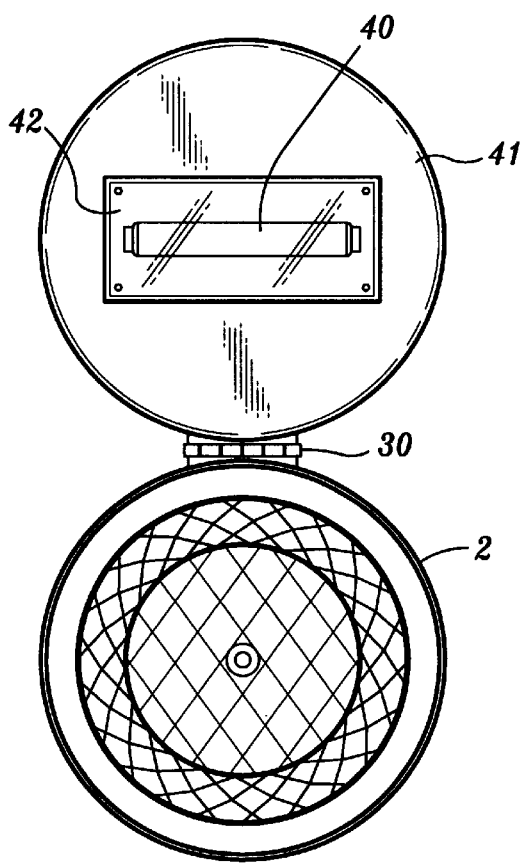
FIG. 4 is a partial front view of a food article washer including an ultraviolet light source according to an embodiment of the present invention.

Another embodiment of the present invention is depicted in FIG. 4 and is similar to the embodiments shown in FIGS. 1 and 2. However, this embodiment of the present invention includes one or more ultraviolet light sources 40 which may be provided within lid 41, as shown. Ultraviolet radiation, particularly in the 200–300 nanometer range, is known to be extremely effective in killing micro-organisms such as bacteria, viruses, yeasts and molds, etc. Germicidal lamps are commonly used in the protection of food and beverages and for other disinfection and sterilization applications. Light sources operating at or near certain wavelengths in the ultraviolet range are also capable of producing ozone in air which is also extremely effective in destroying micro-organisms. The ozone can be carried by air to places where the ultraviolet radiation cannot reach.

Figure 5:
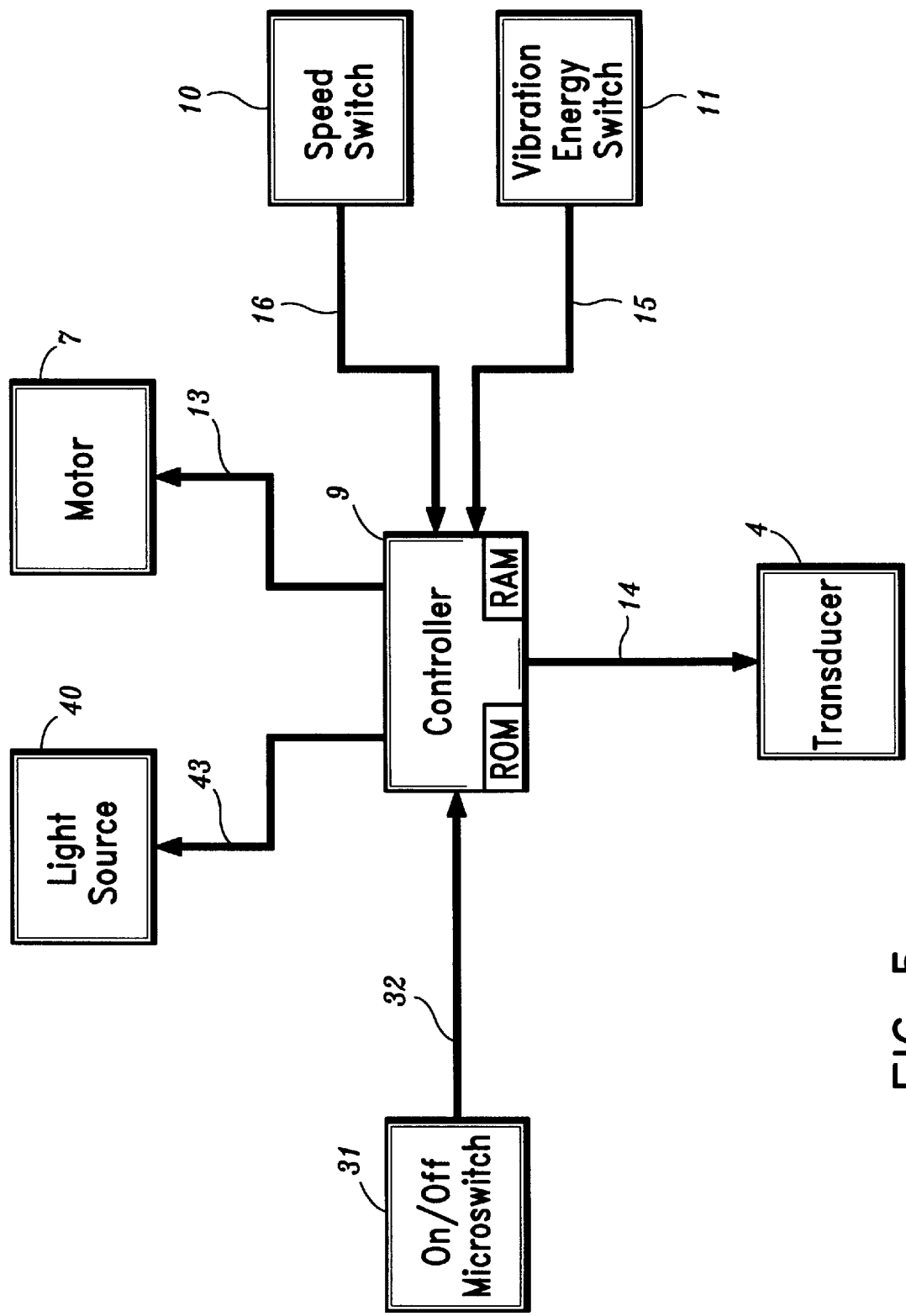
FIG. 5 is a block diagram of circuitry for controlling a food article washer according to an embodiment of the present invention.

Light source 40 is electrically connected to controller 9 by light control line 43 (FIG. 5). Controller 9 can be programmed to control the time of light exposure of the food articles contained within container 2. For example, controller 9 can be preprogrammed or can be programmed by the user to turn on and off the light source at desired times during the cleaning cycle, with or without the transducer operating and/or the platform rotating. In addition, when certain food articles are being cleaned, it may be desirable to operate the device without any cleaning liquid. For example, it may be desirable to simply expose the food articles provided in container 2 to ultraviolet radiation without exposing them to vibrations generated by vibration device 4. This method of sterilizing food articles without the use of a cleaning liquid is particularly effective for use with a light source operating at a wavelength that produces ozone in the air for killing micro-organisms, since the ozone can be carried by the air to places that the ultraviolet radiation cannot reach. Of course, when operating without a cleaning liquid, the vibration devices 4 are not effective and should not be activated. Accordingly, controller 9 can be programmed for a mode in which just the light source is operated during a sterilization process. Controller 9 is programmed to turn light source 40 off when micro switch 31 indicates that lid 12 is in the open position.

As shown in FIG. 4, light source 40 is provided within a recessed portion of lid 41 and is covered with a portion of insulative glass or UV-resistant plastic 42 having a high UV transmittance, for protecting light source 40 from damage by the cleaning liquid and/or the food articles within container 2. Of course, the components making up the washing system, including the basket, the container, etc., should also be made from a V-resistant material in this embodiment to prevent discoloration and/or damage thereto caused by the ultraviolet radiation. The light source 40 can be provided along the walls and/or on or extending from the bottom of container 2 as an alternative to or in addition to the light source being provided in the lid. The light source can also be in the form of a circular tube, for example, which can be provided around the inside periphery of container 2. Preferably, the container 2 and or the basket 3 are made from a shinning metal or are coated with a reflective material to increase the effectiveness of the UV light source 40.

Preferably, basket 3 is provided with a sufficiently open mesh that allows the cleaning fluid and vibrations (e.g., the acoustic waves) to easily penetrate through to the food articles contained therein. The material forming basket 3 preferably absorbs little or none of the vibrations generated by vibration device 4 in the cleaning liquid.

Various types of power sources may be used for powering the food article washer of the present invention. For example, an AC power cord, suitably grounded and insulated, can be provided for powering the device from a typical AC outlet (e.g., 110 VAC or 220 VAC.) In the alternative, the device can be powered using a DC power source such as disposable or rechargeable batteries.

Generally, water is all that is needed as a cleaning fluid. However, various items may be added to or used in place of the water for changing the viscosity of the water and/or creating a detergent effect. For example, vegetable or other types of cooking oils, vinegar and/or baking soda and/or peroxide can be introduced into the container to enhance the cleaning action obtained by the cleaner.

Food articles to be washed are placed in basket 3 and vibration device 4, rotating platform 5 and UV light source 40 are controlled by controller 9. Controller 9 can thus control vibration device 4 to transmit acoustic waves at a desired energy level, rotate platform 5 at a desired speed and operate UV light source 40 for a predetermined period of time. The acoustic waves loosen the foreign substances from the food articles and the UV light source kills micro-organisms on the food articles. The basket containing the food articles can then be removed from the container and the food articles can be rinsed under running tap water to remove the loosened foreign substances.

The present invention thus provides an efficient and effective means for cleaning and/or sterilizing various types of food articles, including, fruits, vegetables, meats, grains, etc.

It will be appreciated that various changes in the details, materials, and arrangements of the parts that have been described and illustrated in order to explain the nature of this invention may be made by those skilled in the art without departing from the spirit of the present invention, the scope of which is limited only by the following claims.

What is claimed is:

1. A consumable food article washer for washing consumable food articles comprising:

a container for containing consumable food articles and a liquid;

a basket provided within the container for holding the consumable food articles inside the container;

a light source provided within the container for exposing the consumable food articles and the liquid to a wavelength of light effective for killing micro-organisms, at least one of the container and basket including a reflective inner surface for increasing an effectiveness of the light source, a sonic vibration device for imparting sonic vibrations to the liquid contained within the container without coming into physical contact with the consumable food articles, the vibrations driving the liquid into the consumable food articles, and a control for selectively controlling an energy level of the sonic vibrations imparted by said sonic vibration device.

2. A food article washer as recited in claim 1, wherein the basket is removable from the container.

3. A food article washer as recited in claim 1, wherein the sonic vibration device comprises a transducer for generating acoustic energy in the cleaning liquid.

4. A food article washer as recited in claim 3, wherein the transducer comprises a sonic transducer.

5. A food article washer as recited in claim 1, wherein the basket allows acoustic energy to penetrate through to the food articles contained therein.

6. A food article washer as recited in claim 1, further comprising a spinner for spinning the basket within the container.

7. A food article washer as recited in claim 6, wherein the spinner comprises a powered device for spinning the basket within the container.

8. A food article washer as recited in claim 6, wherein the spinner comprises a hand driven device for spinning the basket within the container by hand.

9. A food article washer as recited in claim 1 wherein the sonic vibration device comprises a transducer for generating acoustic energy in the cleaning liquid and further comprising a spinning platform for spinning the basket within the container and a controller for controlling the level of acoustic energy generated by the transducer and the spin rate of the spinner.

10. A food article washer as recited in claim 1, further comprising a lid for covering the container.

11. A food article washer as recited in claim 10, wherein the lid is provided on a hinge.

12. A food article washer as recited in claim 1, wherein the wavelength effective for killing micro-organisms is in the ultraviolet range.

13. A food article washer as recited in claim 1, wherein the wavelength effective for killing micro-organisms generates ozone in the air within the container.

14. A food article washer as recited in claim 1, further comprising a lid, wherein the light source is provided within the lid.

15. A food article washer as recited in claim 14, wherein the lid is provided on a hinge.

16. A food article washer as recited in claim 15, wherein a switch is provided in relation to the lid and prevents operation of the light when the lid is in an open position.

17. A consumable food article washer as recited in claim 1, wherein the controller is capable of being programmed to automatically run in cycles.

18. A consumable food article washer as recited in claim 17, wherein the controller is capable of being programmed to include a soak cycle for soaking the consumable food articles prior to activation of the vibration device.

19. A consumable food article washer as recited in claim 17, wherein the controller is capable of being programmed to operate the vibration device at various energy levels at different times during a wash cycle.

20. A consumable food article washer for washing consumable food articles comprising:
a container dimensioned for housing consumable food articles and a liquid, the container including a reflective inner surface;
a light source for exposing the consumable food articles and the liquid within the container to ultraviolet radiation effective for killing micro-organisms, the reflective inner surface of the container increasing an effectiveness of the light source;
a generator for generating sonic energy within the liquid used for cleaning the consumable food articles without coming into physical contact with the consumable food articles, the sonic energy driving the liquid into the consumable food articles; and
a controller for selectively controlling an energy level of the sonic energy generated within the liquid by said generator.

21. A food article washer as recited in claim 20, further comprising a basket provided within the container for holding the food articles inside the container.

22. A food article washer as recited in claim 21, further comprising a spinner for spinning the basket.

23. A food article washer as recited in claim 22, wherein, wherein the spinner comprises a power operated device.

24. A food article washer as recited in claim 22, wherein the spinner comprises a hand driven device.

25. A food article washer as recited in claim 21, wherein the basket comprises a removable basket.

26. A consumable food article washer for washing consumable food articles comprising:
a container for containing consumable food articles and a liquid;
a rotating basket provided within the container for holding the consumable food articles inside the container, the rotating basket being driven by a motor;
a sonic vibration device for imparting sonic vibrations to the liquid contained within the container without coming into physical contact with the consumable food articles, the vibrations driving the liquid into the consumable food articles;
a UV light source for generating a light in the container and exposing the consumable food articles and the liquid, at a wavelength effective for killing micro-organisms on the consumable food articles; and
a controller for selectively controlling a speed of rotation of the rotating basket, an energy level of the sonic vibrations imparted by the vibration device and a time of operation of the UV light source.

27. A consumable food article cleaner capable of operating with or without a liquid for cleaning the consumable food articles comprising:
a container for containing consumable food articles and capable of holding a liquid;
a basket provided within the container for holding the consumable food articles inside the container;
a light source provided within the container for exposing an inside of the container to a wavelength of light effective for killing micro-organisms;
a sonic vibration device for imparting sonic vibrations to liquid contained within the container without coming into physical contact with the consumable food articles, the vibrations driving liquid into the consumable food articles; and
a controller capable of selectively operating the washer in at least one of a plurality of modes including: a) a wet mode in which liquid is provided in the container and at least one of the sonic vibration device and the light source are operated for cleaning the consumable food articles; and, b) a dry mode in which no liquid is provided in the container and the light source is operated at a wavelength effective for generating ozone in air within the container for cleaning the consumable food articles.

28. A consumable food article washer for washing consumable food articles comprising:
a container dimensioned for housing consumable food articles and a liquid, the container including a reflective interior;
a light source for directly exposing the consumable food articles and the liquid within the container to a wavelength of light effective for killing micro-organisms, the reflective interior of the container reflecting the light and increasing an effectiveness of the light source; and a generator for generating energy within the liquid used for cleaning the consumable food articles without coming into physical contact with the consumable food articles, the energy driving the liquid into the consumable food articles.

29. A consumable food article washer as recited in claim 28, further comprising a removable basket for holding the food articles within the container.

30. A consumable food article washer as recited in claim 29, wherein the removable basket has a reflective surface for increasing an effectiveness of the light source.

31. A consumable food article washer for washing consumable food articles comprising:

a container for containing consumable food articles and a liquid;

a basket for holding the consumable food articles and dimensioned to fit within the container;

a vibration device for imparting vibrations to the liquid contained within the container without coming into physical contact with the consumable food articles, the vibrations driving the liquid into the consumable food articles; and a light source for generating a light in the container and exposing the consumable food articles and the liquid at a wavelength effective for killing micro-organisms, at least one of the container and the basket including a reflective surface for reflecting the generated light for increasing an effectiveness of the light source.

32. A consumable food article washer for washing consumable food articles comprising:

a container for containing consumable food articles and a liquid;

a basket provided within the container for holding the consumable food articles inside the container;

a light source provided within the container for exposing the consumable food articles and the liquid to a wavelength of light effective for killing micro-organisms;

a vibration device including sonic and ultrasonic transducers for imparting sonic and ultrasonic vibrations, respectively, to the liquid contained within the container without coming into physical contact with the consumable food articles, the vibrations driving the liquid into the consumable food articles; and a controller for selectively controlling an energy level of the sonic and ultrasonic vibrations generated by the vibration device and a period of operation of the light source.

33. A consumable food article washer for washing consumable food articles comprising:

a container dimensioned for housing consumable food articles and a liquid;

a rotatable basket for holding the consumable food articles within the container, the rotatable basket being driven by a motor;

a light source for exposing the consumable food articles and the liquid within the container to a wavelength of light effective for killing micro-organisms;

a generator for generating at least one of sonic energy and ultrasonic energy within the liquid used for cleaning the consumable food articles without coming into physical contact with the consumable food articles, the energy driving the liquid into the consumable food articles; and a controller for selectively controlling the motor for controlling a speed of rotation of the basket and for controlling the generator for controlling a level of energy of the at least one of sonic energy and ultrasonic energy.

34. A consumable food article washer for washing consumable food articles comprising:

a container for containing consumable food articles and a liquid;

a rotating basket provided within the container for holding the consumable food articles inside the container, the rotating basket being driven by a motor;

a vibration device for imparting vibrations to the liquid contained within the container without coming into physical contact with the consumable food articles, the vibrations driving the liquid into the consumable food articles;

a light source for generating a light in the container and exposing the consumable food articles and the liquid, at a wavelength effective for killing micro-organisms, at least one of the container and the basket including a reflective surface for increasing an effectiveness of the light source; and a controller for selectively controlling a speed of rotation of the rotating basket, an energy level of the vibrations imparted by the vibration device and a time of operation of the light source.

35. A consumable food article washer for washing consumable food articles comprising:

a container for containing consumable food articles and a liquid;

a rotatable basket provided within the container for holding the consumable food articles inside the container;

a light source provided within the container for exposing the consumable food articles and the liquid to a wavelength of light effective for killing micro-organisms on the consumable food articles;

a sonic vibration device for imparting sonic vibrations to the liquid contained within the container without coming into physical contact with the consumable food articles, the vibrations driving the liquid into the consumable food articles; and a controller for selectively controlling a speed of rotation of the rotatable basket, an energy level and duration of the sonic vibrations and a time of operation of the light source, the controller programmable to include a soak cycle for soaking the consumable food articles prior to activation of the sonic vibration device.

* * * * *